(12) United States Patent
Woo et al.

(10) Patent No.: US 10,733,597 B2
(45) Date of Patent: Aug. 4, 2020

(54) SMART CARD AND METHOD FOR CONTROLLING THE SAME

(71) Applicant: LG ELECTRONICS INC., Seoul (KR)

(72) Inventors: Heekyung Woo, Seoul (KR); Seokmin Hong, Seoul (KR); Sanghyun Eim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 590 days.

(21) Appl. No.: 15/487,367

(22) Filed: Apr. 13, 2017

(65) Prior Publication Data
US 2017/0330173 A1 Nov. 16, 2017

(30) Foreign Application Priority Data
May 10, 2016 (KR) .......................... 10-2016-0057062

(51) Int. Cl.
*G06Q 40/00* (2012.01)
*G06Q 20/34* (2012.01)
(Continued)

(52) U.S. Cl.
CPC ..... *G06Q 20/3572* (2013.01); *G06K 19/0718* (2013.01); *G06K 19/0723* (2013.01);
(Continued)

(58) Field of Classification Search
CPC .............. G06Q 40/00; G06Q 20/3572; G06Q 20/40145; G06K 19/0723; G06K 19/07354
See application file for complete search history.

(56) References Cited

U.S. PATENT DOCUMENTS

2005/0139656 A1 6/2005 Arnouse
2007/0005511 A1 1/2007 Martinez
(Continued)

FOREIGN PATENT DOCUMENTS

KR 1020010025234 4/2001

OTHER PUBLICATIONS

NewsRX: Patents; Researchers Submit Patent Application, "Mobile Devices, Terminal Devices, and Authentication Methods Thereof", for Approval, Computer Weekly News [Atlanta] Jul. 9, 2015: 2098. (Year: 2015).*

(Continued)

*Primary Examiner* — Lalita M Hamilton
(74) *Attorney, Agent, or Firm* — Lee, Hong, Degerman, Kang & Waimey

(57) ABSTRACT

The present invention relates to a smart card including a sensor for sensing a finger touch and a controller for causing a first setting change by setting the smart card from a default payment method to a selected payment method, when a fingerprint of the user is recognized based on the finger touch sensed by the sensor; causing a second setting change by setting the smart card from the selected payment method to the default payment method when the fingerprint of the user and a fingerprint of a first person other than the user are simultaneously recognized and a first preset time elapses after completion of payment, and causing a third setting change by setting the smart card from the default payment method to the selected payment method when the fingerprint of the user and the fingerprint of the first person are simultaneously recognized again within a second preset time.

20 Claims, 10 Drawing Sheets

(51) Int. Cl.
  G06K 19/07 (2006.01)
  G06K 19/073 (2006.01)
  G06Q 20/40 (2012.01)
(52) U.S. Cl.
  CPC ..... G06K 19/07354 (2013.01); G06Q 20/341 (2013.01); G06Q 20/40145 (2013.01)

(56) References Cited

U.S. PATENT DOCUMENTS

| | | | |
|---|---|---|---|
| 2008/0120509 A1 | 5/2008 | Simon | |
| 2015/0235225 A1 | 8/2015 | Christie | |
| 2016/0307189 A1* | 10/2016 | Zarakas | G06Q 20/352 |
| 2017/0109730 A1* | 4/2017 | Locke | G06Q 20/341 |

OTHER PUBLICATIONS

PCT International Application No. PCT/KR2017/004267, Notification of Transmittal of the International Search Report and the Written Opinion of the International Searching Authority, or Declaration dated Aug. 24, 2017, 10 pages.

* cited by examiner

SMART CARD AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2016-0057062, filed on May 10, 2016, the contents of which are hereby incorporated by reference herein in its entirety.

BACKGROUND OF THE INVENTION

1. Field of the Invention

This specification relates to a smart card capable of performing payment using a selected payment means, and a method for controlling the same.

2. Background of the Invention

In general, a smart card, which refers to an electronic card that a microprocessor chip, a memory, a security algorithm and a microcomputer are embedded in a plastic card with almost the same thickness as that of a typical credit card, is a CPU-intelligent card capable of storing and processing information within the card. The smart card may further include a display unit for outputting image information or a key input unit for receiving a user input, if necessary.

Meanwhile, the smart card includes a semiconductor chip having a memory device, and a microprocessor such as the CPU, and thus can perform functions separately requiring for storing information and also various additional functions using the CPU of the smart card.

The smart card may further include, as the additional functions, a traffic card function, functions associated with partnership services, and the like. In addition, the smart card can provide a higher security function, owing to the embedded CPU and a memory with a more improved storage capacity.

Accordingly, in recent time, various methods for using many functions of the smart card more efficiently are studied actively.

SUMMARY OF THE INVENTION

Therefore, an aspect of the detailed description is to solve the aforementioned problems and other drawbacks.

Another aspect of the detailed description is to provide a smart card, capable of being automatically set from a default payment means to a previously-used payment means by detecting a situation that a person other than the user performs payment, through a finger scan technology, in a state that the setting of the smart card has been reset to a default payment means after the other person performs proxy payment using payment means selected by a cardholder.

To achieve these and other advantages and in accordance with the purpose of this specification, as embodied and broadly described herein, there is provided a smart card including, a sensor configured to sense a finger touch; and a controller configured to cause a first setting change by setting the smart card from a default payment method to a selected payment method selected by a user, when a fingerprint of the user is recognized based on the finger touch sensed by the sensor; cause a second setting change by setting the smart card from the selected payment method to the default payment method when the fingerprint of the user and a fingerprint of a first person other than the user are simultaneously recognized and a first preset time elapses after completion of payment using the selected payment method; and cause a third setting change by setting the smart card from the default payment method to the selected payment method when the fingerprint of the user and the fingerprint of the first person are simultaneously recognized again within a second preset time.

In an exemplary embodiment, the smart card may further include a display, wherein the controller is further configured to set the display to an inactive state after completion of the payment.

In another exemplary embodiment, the smart card may further include an input unit, wherein the controller is further configured to set the input unit to an inactive state when the fingerprint of the user is not recognized after the first setting change.

In another exemplary embodiment, the controller may be configured to reactivate the input unit when the fingerprint of the user is recognized again.

In another exemplary embodiment, the controller may be configured to set the input unit to an inactive state after the first setting change.

In another exemplary embodiment, the controller may set the input unit to an inactive state when the fingerprint of the first person and a fingerprint of a second person other than the first person are simultaneously recognized after the first setting change.

In another exemplary embodiment, the first setting change is caused when the fingerprint of the user is recognized in addition to simultaneously recognizing the fingerprint of the first person; and the controller is further configured to set a timer corresponding to a payment-available time period when the fingerprint of the first person is not continuously recognized after the first setting change.

In another exemplary embodiment, the controller may deactivate the timer when the fingerprint of the first person is continuously recognized.

In another exemplary embodiment, the controller may set the input unit to an inactive state when the fingerprint of the user is not recognized after the first setting change.

In another exemplary embodiment, the smart card may further comprise a display, wherein the controller is further configured to cause the display to display payment information completed using the selected payment method when the fingerprint of the user is recognized after completion of the payment.

In another exemplary embodiment, the controller may cause the display to display completed payment information using the selected payment method when only the fingerprint of the user is recognized after the third setting change.

In another exemplary embodiment, the controller may cause the third setting change when the fingerprint of the user and the fingerprint of the first person are simultaneously recognized again within the second preset time after only the fingerprint of the user is recognized following completion of the payment.

According to another aspect of the present invention, there is provided a method for controlling a smart card, the method including sensing a finger touch to the smart card; causing a first setting change by setting the smart card from a default payment method to a selected payment method selected by a user when a fingerprint of the user is recognized based on the finger touch; cause a second setting change by setting the smart card from the selected payment method to the default payment method when the fingerprint of the user and a fingerprint of a first person other than the user are simultaneously recognized and a first preset time elapses after completion of payment using the selected payment method; and cause a third setting change by resetting the smart card from the default payment method to the selected payment method when the fingerprint of the user and the fingerprint of the first person are simultaneously recognized again within a second preset time.

In an exemplary embodiment, a method may further include setting a display of the smart card to an inactive state after completion of the payment.

In another exemplary embodiment, the method may further include setting an input unit of the smart card to an inactive state when the fingerprint of the user is not recognized after the first setting change; and reactivating the input unit when the fingerprint of the user is recognized again.

In another exemplary embodiment, the method may include setting an input unit of the smart card to an inactive state after the first setting change.

In another exemplary embodiment, the method may include setting an input unit of the smart card to an inactive state when the fingerprint of the first person and a fingerprint of a second person other than the first person are simultaneously recognized after the first setting change.

In another exemplary embodiment, the first setting change is caused when the fingerprint of the user is recognized in addition to simultaneously recognizing the fingerprint of the first person; and the method further includes setting a timer corresponding to a payment-available time period when the fingerprint of the first person is not continuously recognized after the first setting change, and deactivating the timer when the fingerprint of the first person is continuously recognized.

In another exemplary embodiment, the method may include setting a timer corresponding to a payment-available time period when the fingerprint of the first person and a fingerprint of a second person other than the first person are simultaneously recognized after the first setting change.

In another exemplary embodiment, the method may include displaying completed payment information using the selected payment method on a display of the smart card when only the fingerprint of the user is recognized after the third setting change; and causing the third setting change when the fingerprint of the user and the fingerprint of the first person are simultaneously recognized again within the second preset time after only the fingerprint of the user is recognized following completion of the payment.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1A:
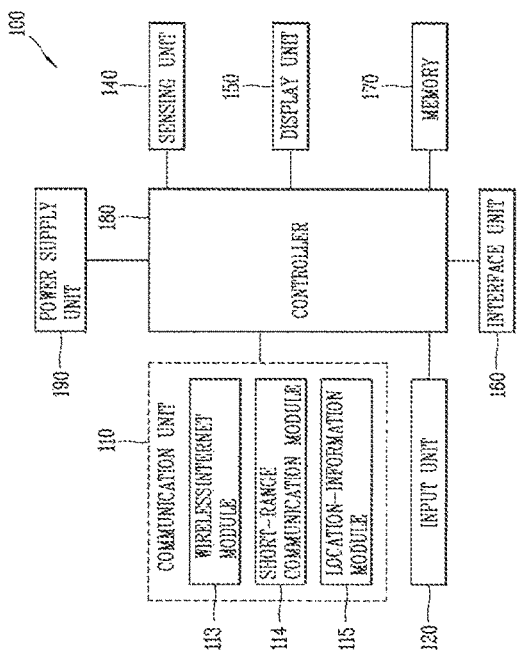
FIG. 1A is a block diagram illustrating a smart card in accordance with the present invention.

First, FIG. 1A is a block diagram illustrating a smart card 100 in accordance with the present invention.

The smart card 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 typically includes one or more modules which permit communications such as wireless communications between the smart card 100 and a wireless communication system, communications between the smart card 100 and another mobile terminal, communications between the smart card 100 and an external server. Further, the wireless communication unit 110 typically includes one or more modules which connect the mobile terminal 100 to one or more networks.

The wireless communication unit 110 includes one or more of a wireless Internet module 113, a short-range communication module 114, and a location information module 115.

The input unit 120 may include at least one key (e.g., a touch key, a push key, and the like) for allowing a user to input information.

The sensing unit 140 is typically implemented using one or more sensors configured to sense internal information of the mobile terminal, the surrounding environment of the mobile terminal, user information, and the like. For example, the sensing unit 140 may include a finger scan sensor, a battery gauge, and the like. Meanwhile, the smart card 100 disclosed herein may be configured to utilize information obtained from one or more of those sensors.

The output unit 150 is typically configured to output image information. The display unit 150 may have an inter-layered structure or an integrated structure with a touch sensor in order to facilitate a touch screen. The touch screen may provide an output interface between the smart card 100 and a user, as well as function as the user input unit 123 which provides an input interface between the smart card 100 and the user.

The interface unit 160 serves as an interface with various types of external devices that can be coupled to the smart card 100. The interface unit 170 may also be implemented as an accessory device connectable to the smart card 100 in a wireless manner. In this instance, the smart card 100 may be connected to an external device, such as a smart phone, a PC or a personal digital assistance (PDA), through the interface unit 160, and perform assorted control functions associated with the connected external device.

Also, the memory 170 is typically implemented to store data to support various functions or features of the smart card 100. The memory 170 may be configured to store application programs executed in the smart card 100, data or instructions for operations of the smart card 100. Some of these application programs may be downloaded from an external server via wireless communication. Other application programs may be installed within the smart card 100 at time of manufacturing or shipping, which is typically the case for basic functions (e.g., a payment function, a traffic card function, etc.) of the smart card 100. Meanwhile, It is common for application programs to be stored in the memory 170, installed in the smart card 100, and executed by the controller 180 to perform an operation (or function) for the smart card 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the smart card 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the smart card 100.

First, regarding the wireless communication unit 110, the wireless Internet module 113 is configured to facilitate wireless Internet access. This module may be internally or externally coupled to the smart card 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the smart card 100 and a wireless communication system, communications between the smart card 100 and another mobile terminal or PC, or communications between the smart card 100 and a network where another terminal (or an external server) is located, via wireless area networks. One example of the wireless area networks is a wireless personal area networks.

Here, another mobile terminal may be a wearable device, for example, a smart watch, a smart glass or a head mounted display (HMD), which is able to exchange data with the smart card 100 (or otherwise cooperate with the smart card 100). The short-range communication module 114 may sense or recognize the wearable device, and permit communication between the wearable device and the smart card 100. In addition, when the sensed wearable device is a device which is authenticated to communicate with the smart card 100, the controller 180, for example, may cause transmission of at least part of data processed in the smart card 100 to the wearable device via the short-range communication module 114. Hence, a user of the wearable device may use the data processed in the smart card 100 on the wearable device. For example, when a call is received in the smart card 100, the user may answer the call using the wearable device. Also, when a message is received in the smart card 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the smart card 100 can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the smart card 100. The location information module 115 is a module used for acquiring the position (or the current position) and may not be limited to a module for directly calculating or acquiring the position of the smart card 100.

The input unit 120 is a component that permits input by a user. Such information input through the input unit 120 may enable the controller 180 to control operation of the smart card 100 to correspond to the input information. The input unit 120 may include one or more of a mechanical input element (or a mechanical key, for example, a button located on a front and/or rear surface or a side surface of the smart card 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the smart card at a location that is other than the touch screen. On the other hand, the virtual key or the visual key may be displayed on the touch screen in various shapes, for example, graphic, text, icon, video, or a combination thereof.

Meanwhile, as an example of the input unit 120, the display unit 150 and a touch sensor may be coupled to implement a touch screen. For example, the touch sensor may be configured to convert changes of pressure applied to a specific part of the touch screen, or convert capacitance occurring at a specific part of the touch screen, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 150 has been touched. Here, the touch controller may be a component separate from the controller 180, the controller 180, and combinations thereof.

Meanwhile, the controller 180 may execute the same or different controls according to a type of touch object (e.g., user's different fingers) that touches the touch screen (or a touch key provided in addition to the touch screen).

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

The display unit 150 outputs information processed in the smart card 100. For example, the display unit 150 may output information related to a battery status (a remaining amount, temperature, etc.) or information related to a user-selected credit card among a plurality of preregistered credit cards. In addition, the display unit 150 may output information received from a specific external server corresponding to a selected credit card (e.g., a totally-paid amount by a currently-selected credit card for a predetermined period of time or a remaining amount available on the credit card for usage).

The interface unit 160 serves as an interface for external devices to be connected with the smart card 100. For example, the interface unit 160 can receive data transmitted from an external device, receive power to transfer to elements and components within the smart card 100, or transmit internal data of the smart card 100 to such external device. The interface unit 160 may be implemented in the form of an accessory device connectable with the smart card 100 in a wired or wireless manner, as aforementioned, and may include wired or wireless headset ports, external power supply ports, wired or wireless data ports, memory card ports, and the like.

The memory 170 can store programs to support operations of the controller 180 and store input/output data (for example, phonebook, messages, still images, videos, etc.).

The memory 170 may include one or more types of storage mediums including a solid state disk (SSD) type, a silicon disk drive (SDD) type, a Random Access Memory (RAM), a Static Random Access Memory (SRAM), a Read-Only Memory (ROM), an Electrically Erasable Programmable Read-Only Memory (EEPROM), a Programmable Read-Only memory (PROM), and the like. The smart card 100 may also be operated in relation to a network storage device that performs the storage function of the memory 170 over a network, such as the Internet.

Meanwhile, as aforementioned, the controller 180 controls the operation associated with an application program and the general operations of the smart card 100. For example, the controller 180 may set or release a lock state for restricting a user from inputting a control command with respect to applications when a status of the smart card 100 meets a preset condition.

The controller 180 can also perform the controlling and processing associated with a payment function which is carried out using one of a plurality of prestored credit card, or perform a different function according to a touch input applied to the touch screen or an input time of the touch input. In addition, the controller 180 can control one or a combination of those components in order to implement various exemplary embodiments on the smart card 100 disclosed herein.

The power supply unit 190 receives external power or provide internal power and supply the appropriate power required for operating respective elements and components included in the smart card 100. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of a structure of the smart card 100 or an arrangement structure of those components in accordance with the one embodiment an arrangement illustrated in FIG. 1A, with reference to FIGS. 1B and 1C.

Figure 1B:
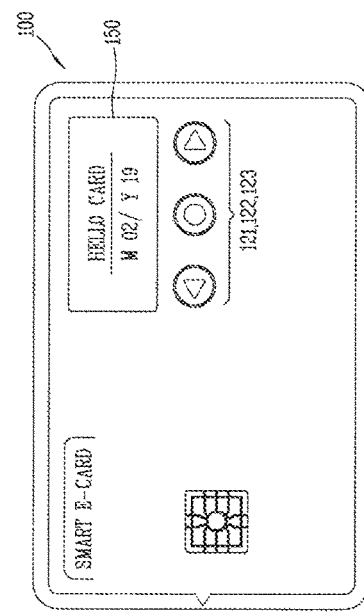
FIGS. 1B and 1C are conceptual views of one example of a smart card according to the present invention, viewed from different directions.
Figure 1C:
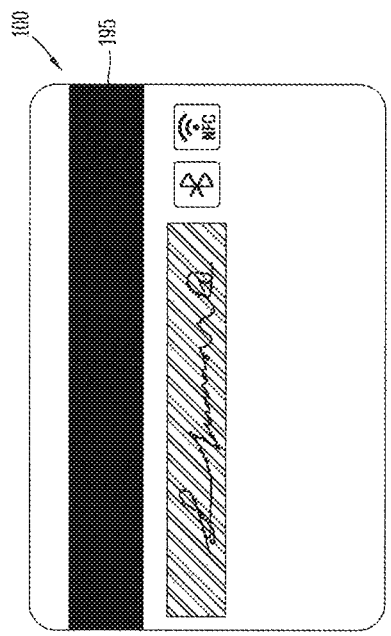

As illustrated in FIGS. 1B and 1C, the smart card 100 may have a body similar to a general credit card. And, as illustrated in FIG. 1B, the smart card 100 may include the display unit 150 provided on at least part of a front surface thereof and possibly configured as a touch screen. The smart card 100 may further include at least one key 121, 122, 123 for receiving a user input. Here, the at least one key 121, 122, 123 may also be output in a form of a soft key which is output through the display unit 150.

Meanwhile, as illustrated in FIGS. 1B and 10, the smart card 100 according to the embodiment disclosed herein may be implemented in a similar shape to a typical credit card. Also, the smart card 100, although not illustrated in FIGS. 1B and 10, may have an almost similar thickness to that of such typical credit card. This may allow the user to carry the smart card 100 according to the embodiment of the present invention, like having the typical credit card, and to perform payment using the smart card 100 according to the embodiment of the present invention in a similar manner to payment using the typical credit card.

That is, for a tapping method of performing payment in response to a typical credit card being brought into contact with a specific point of a Point Of Sale (POS) terminal, the controller 180 of the smart card 100 according to the embodiment disclosed herein may receive a payment request from the POS terminal when the smart card 100 comes in contact with the POS terminal. And, the controller 180 may transmit information related to a specific credit card set by a user to the POS terminal through an NFC or Bluetooth module provided in the communication unit 110, in response to the received payment request, thereby enabling the payment.

Also, for an ATM terminal of a bank, when a specific function is executed as a credit card is inserted into the ATM terminal, the smart card 100 according to the embodiment disclosed herein is implemented in a similar shape to a typical credit card, as aforementioned, and thus can be inserted into an introduction hole of the ATM terminal. As illustrated in FIGS. 1B and 10, the smart card is provided with a chip and a magnetic tape 195 at the same positions as those of a typical credit card. Accordingly, the ATM terminal may recognize the smart card 100 using the chip and the magnetic tape 195 so as to allow for the payment using the smart card in the same manner as using the typical credit card. Here, the magnetic tape 195 provided on the smart card 100 according to the embodiment disclosed herein may include identification information related to the smart card 100. In this instance, the ATM terminal may identify that the currently-inserted card is the smart card 100 and receive information related to a specific credit card from the controller 180 of the smart card 100, thereby allowing a function associated with the specific credit card to be executed.

Meanwhile, when the identification information related to the smart card 100 is included in the magnetic tape 195 provided on the smart card 100 according to the embodiment disclosed herein, the smart card 100 may also be used, similar to a typical credit card, even in a POS terminal which reads a magnetic tape of a credit card. This is enabled through a series of processes of identifying by the POS terminal that a currently-read credit card is the smart card 100 by reading the magnetic tape 195, and receiving information related to a user-selected specific credit card from the controller 180 of the smart card 100.

Figure 1D:
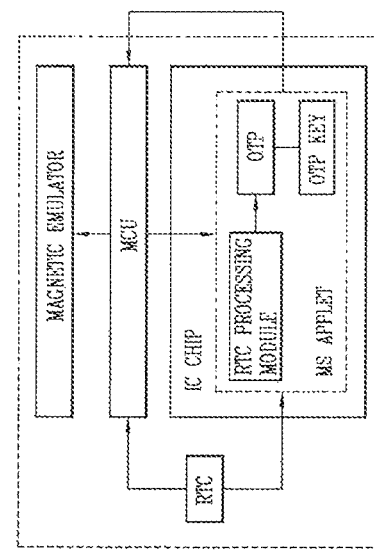
FIG. 1D is a block diagram illustrating an operation of a real time clock (RTC) module provided in a smart card in accordance with the present invention.

FIG. 1D is a block diagram illustrating an operation of a real time clock (RTC) module provided in a smart card according to the present invention.

As illustrated in FIG. 1D, the smart card 100 according to the present invention may include an RTC module which checks a lapse of time.

In an exemplary embodiment, when a user selects a payment card (payment means) for MS payment, the RTC module may transfer time information to a micro controller unit (MCU) and an integrated-circuit (IC) chip.

In detail, when the user selects a credit card for payment, the MCU may transfer a payment request to an MS applet within the IC chip. Accordingly, a real time may be transferred to an OTP applet through an RTC processing module within the MS applet.

Afterwards, the MS applet may generate a disposable token based on an OTP key value of the OTP applet. The generated token may be mapped on an MS track in a magnetic emulator through the MCU.

That is, according to the present invention, payment may be carried out using a disposable token number. Regarding a disposable token structure, when the user registers a credit card, payment tokens 1, 2, 3 of the corresponding card are provided from a card company. Accordingly, the user receives values of the payment tokens 1, 2, 3 and the OTP information, thereby combining track information for payment.

Also, after completion of the payment, the smart card 100 may automatically be switched off. As an exemplary embodiment, when a user action (input) is not applied for 30 seconds after the payment, the MCU may power the smart card 100 off. To this end, the MCU receives counted time information from the RTC module.

That is, according to the embodiment illustrated in FIG. 1D, the MS payment and the power-off after the payment may be implemented by the operation of the RTC module. In detail, the RTC module may utilize time information during the OTP generation for combining the disposable tokens upon the MS payment. Also, the RTC module may check a time for the automatic power-off after the completion of the payment.

Also, as an exemplary embodiment, the RTC module may be included in the controller 180 or provided as a separate component.

Hereinafter, description will be given of embodiments related to a control method which can be implemented in the smart card 100 with the configuration, with reference to the accompanying drawings. It will be obvious to those skilled in the art that the present invention can be embodied into other specific forms without departing from the spirit and essential features of the present invention.

Figure 2A:
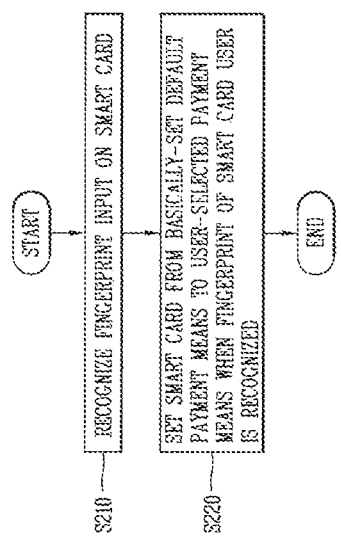
FIG. 2A is a flowchart illustrating a method of controlling a smart card in accordance with the present invention.

FIG. 2A is a flowchart illustrating a method of controlling a smart card in accordance with the present invention.

Referring to FIG. 2A, a fingerprint input on the smart card 100 is recognized (scanned) (S210).

In detail, a fingerprint 310 of a cardholder (user) may be recognized (scanned) on the smart card 100, in response to an operation that the cardholder holds the smart card 100.

In this instance, a different fingerprint may be input according to a manner that the user holds the smart card 100. To this end, a plurality of fingerprints for authentication may be prestored in the smart card 100.

Also, a finger scan sensor may be disposed on an entire or partial area of the smart card 100. As an exemplary embodiment, the finger scan sensor may be disposed only on an area that the user's finger frequently contacts. Or, more finger scan sensors may be disposed on an area that the user's finger frequently contacts, than the other area, or a finger scan sensor with a more precise scanning capability may be disposed on the frequently-contacted area with the user's finger.

As another exemplary embodiment, the finger scan sensor may additionally be provided even on a rear surface of the smart card 100, in addition to a front surface. This may allow that the user's thumb is scanned on the front surface and the user's forefinger is scanned on the rear surface.

When the finger of the user holding the smart card is scanned, payment means of the smart card 100 is set from a basically-set default payment means to payment means selected by the user (S220).

The payment means refers to means allowing the transaction of goods or services, and may include various forms. Examples of the payment means may include a credit card, a debit card, and even various types of virtual money, such as a bit coin or cyber money.

Also, the payment means may include an accumulation (point) card in which partnership points are accumulated through preset partnership services. Here, the accumulation card may be a card that points are merely accumulated, or a card that accumulated points are subtracted as many as being used for payment.

Meanwhile, the payment means may be preregistered (or prestored) in the smart card, or registered (set) by the user.

The default payment means may be defined as payment means which is set as a default. For example, when the smart card 100 is powered on, the default payment means may be a set credit card.

In detail, the step S220 may include setting the smart card 100 from the user-selected payment means to the default payment means when the user's fingerprint and a first person's fingerprint are simultaneously recognized and a preset time elapses after payment using the user-selected payment means is completed, and resetting the smart card 100 from the default payment means to the selected payment means when the user's fingerprint and the first person's fingerprint are simultaneously recognized again within a preset time.

As an exemplary embodiment, when 30 seconds elapse after completion of payment by a first credit card selected by the user, the setting of the smart card 100 may automatically be changed into the default payment means.

Similarly, when a cardholder's fingerprint and a clerk's fingerprint are simultaneously recognized within a short term of time and 30 seconds elapse after the completion of the payment by the user-selected first credit card, the setting of the smart card 100 may automatically be changed into the default payment means.

In this manner, a situation (proxy payment) that the cardholder hands over the smart card 100 to a clerk may be detected in response to simultaneous recognition of the cardholder's fingerprint and a fingerprint of a person who performs the proxy payment. In detail, the situation of the proxy payment can be detected on the basis that only the cardholder's fingerprint is recognized, both of the cardholder's fingerprint and a clerk's fingerprint are simultaneously recognized for a short term of time, and only the clerk's fingerprint is recognized.

Afterwards, when both of the cardholder's fingerprint and the clerk's fingerprint are simultaneously recognized again for a short term of time within 3 minutes, the setting of the smart card 100 may automatically be changed from the default payment means into the first credit card.

In this manner, a situation (repayment) that the cardholder hands over the smart card 100 to the clerk again may be detected on the basis of the simultaneous recognition of the cardholder's fingerprint and the clerk's fingerprint. In detail, the repayment situation may be detected on the basis that only the cardholder's fingerprint is recognized, both of the cardholder's fingerprint and the clerk's fingerprint are simultaneously recognized for a short term of time, and only the clerk's fingerprint is recognized again.

That is, the payment which is performed after both of the cardholder's fingerprint and the clerk's fingerprint are simultaneously recognized again within a predetermined time may be a cancelation of a previous payment or payment performed in addition to the previous payment.

Accordingly, the setting of the smart card 100 may automatically be changed from the default payment means to payment means which was used for the previous payment. However, this is merely illustrative, and the present invention may not be limited to the payment cancellation or the additional payment.

Hereinafter, a detailed embodiment will be described.

As an exemplary embodiment, the step S220 may include setting the display unit 150 to an inactive (OFF) state when a preset time elapses after completion of the payment using the payment means selected by the user.

As another exemplary embodiment, the step S220 may include setting the input unit 120 to an inactive state (OFF) state when the user's fingerprint is not recognized after both of the user's fingerprint and the first person's fingerprint are simultaneously recognized, and resetting the input unit 120 to an active (ON) state when the user's fingerprint is recognized again.

As another exemplary embodiment, the step S220 may include setting the input unit 120 to an inactive (OFF) state, in response to a simultaneous recognition of the user's fingerprint and the first person's fingerprint.

As another exemplary embodiment, the step S220 may include setting the input unit 120 to an inactive (OFF) state when both of a first person's fingerprint and a second person's fingerprint, different from the first person, are simultaneously recognized after both of the user's fingerprint and the first person's fingerprint are simultaneously recognized.

As another exemplary embodiment, the step S220 may include setting a timer with a preset payment-available time to an active (ON) state when only the continuously-recognized first person's fingerprint is not recognized any more after both of the user's fingerprint and the first person's fingerprint are simultaneously recognized, and setting the timer with the preset payment-available time to an inactive (OFF) state when the first person's fingerprint is continuously recognized again.

As another exemplary embodiment, the step S220 may include setting a timer with a preset payment-available time to an active (ON) state when the first person's fingerprint and a second person's fingerprint, different from the first person, are simultaneously recognized after the user's fingerprint and the first person's fingerprint are simultaneously recognized.

As another exemplary embodiment, the step S220 may include outputting payment information (payment details or payment history) by the selected payment means, in response to a recognition of only the user's fingerprint after both of the user's fingerprint and the first person's fingerprint are simultaneously recognized again within a preset time, and resetting the smart card 100 from the default payment means to the selected payment means, in response to the user's fingerprint and the first person's fingerprint being simultaneously recognized again within a preset time after only the user's fingerprint is recognized.

Hereinafter, detailed embodiments will be described from the perspectives of components.

The sensing unit 140 may recognize (scan) a fingerprint input to the smart card 100.

The controller 180 may set the smart card 100 from a basically-set default payment means to a user-selected payment means when the fingerprint of the user with the smart card 100 is recognized.

In an exemplary embodiment, when the user's fingerprint and a first person's fingerprint, other than the user, are simultaneously recognized, and a preset time elapses after the payment using the user-selected payment means is completed, the controller 180 may set the smart card 100 from the selected payment means to the default payment means. When the user's fingerprint and the first person's fingerprint are simultaneously recognized again within a preset time, the controller 180 may reset the smart card 100 from the default payment means to the selected payment means.

In another exemplary embodiment, the controller 180 may set the display unit 150 to an inactive state (OFF) state when a preset time elapses after the completion of the payment using the user-selected payment means.

In another exemplary embodiment, the controller 180 may set the input unit 120 to an inactive (OFF) state when the user's fingerprint is not recognized after the user's fingerprint and the first person's fingerprint are simultaneously recognized.

In another exemplary embodiment, the controller 180 may reset the input unit 120 to an active (ON) state when the user's fingerprint is recognized again.

In another exemplary embodiment, the controller 180 may set the input unit 120 to an inactive (OFF) state when the user's fingerprint and the first person's fingerprint are simultaneously recognized.

In another exemplary embodiment, the controller 180 may set the input unit 120 to an inactive state, when the first person's fingerprint and a second person's fingerprint, different from the first person, are simultaneously recognized, after the user's fingerprint and the first person's fingerprint are simultaneously recognized.

In another exemplary embodiment, the controller 180 may set a timer with a preset payment-available time to an active (ON) state when the continuously-recognized first person's fingerprint is not recognized after the user's fingerprint and the first person's fingerprint are simultaneously recognized.

In another exemplary embodiment, the controller 180 may set the timer with the preset payment-available time to an inactive (OFF) state when the first person's fingerprint is continuously recognized again.

In another exemplary embodiment, the controller 180 may set a timer with a preset payment-available time to an active state (ON) when the first person's fingerprint and a second person's fingerprint, different from the first person, are simultaneously recognized after the user's fingerprint and the first person's fingerprint are simultaneously recognized.

In another exemplary embodiment, the controller 180 may output payment information by the selected payment means on the display unit 150 when the user's fingerprint is recognized after the completion of the payment using the user-selected payment means.

In another exemplary embodiment, the controller 180 may output payment information by the selected payment means on the display unit 150, when only the user's fingerprint is recognized after the user's fingerprint and the first person's fingerprint are simultaneously recognized again within a preset time.

In another exemplary embodiment, the controller 180 may reset the smart card 100 from the default payment means to the selected payment means when the user's fingerprint and the first person's fingerprint are simultaneously recognized again within a preset time after only the user's fingerprint is recognized.

Meanwhile, the controller 180 may set the display unit 150 to an inactive (OFF) state when a preset time elapses after the completion of the payment using the user-selected payment means.

Figure 2B:
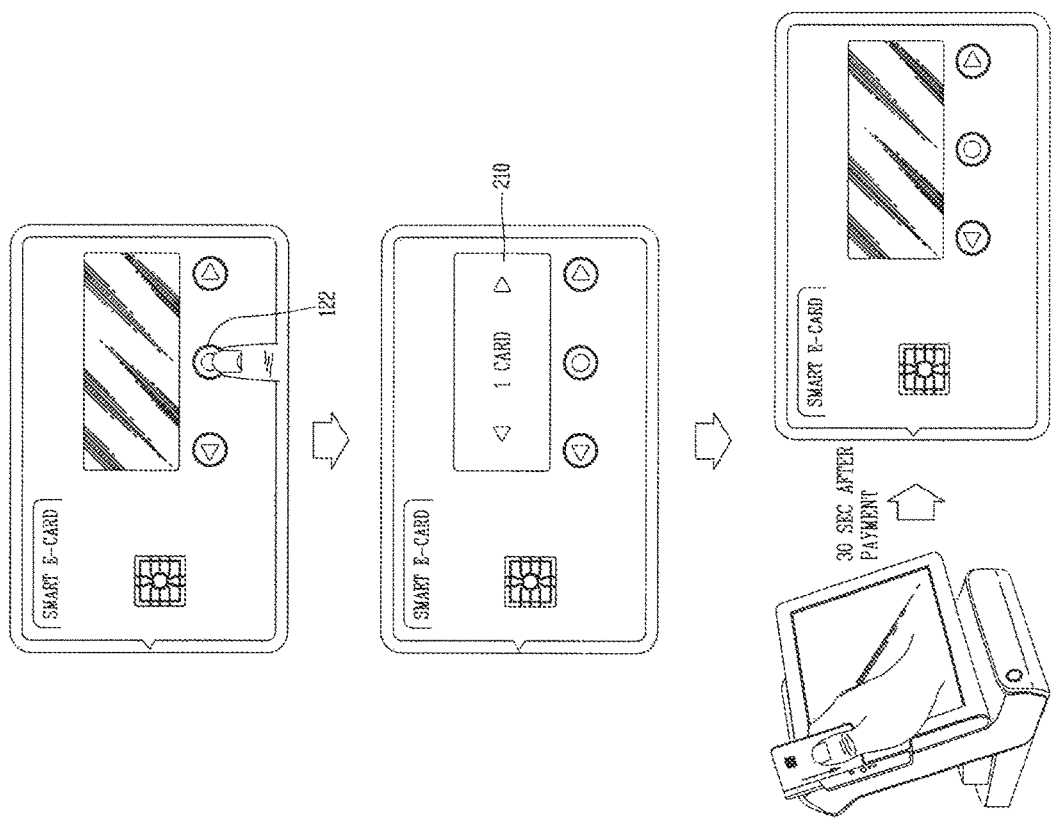
FIG. 2B is a conceptual view illustrating an embodiment in which a display unit is automatically switched into an inactive state when a preset time elapses after payment.

FIG. 2B is a conceptual view illustrating an embodiment in which a display unit is automatically switched into an inactive state when a preset time elapses after payment.

Referring to FIG. 2B, when a touch or push input is applied to a power button 122, the display unit 150 may be switched from an OFF state into an ON state.

In an exemplary embodiment, when the smart card 100 is powered on, screen information related to a default payment means which is basically set for payment may be output on the display unit 150. The screen information related to the default payment means may include a name, an available period or the like in relation to the default payment means.

Afterwards, a list of payment means may be output by applying a touch or push input to a left or right button 121 and 123. As an exemplary embodiment, when the right button 123 is pressed, screen information 210 related to a first credit card may be output. Similarly, the screen information 210 related to the first credit card may include a name, an available period or the like in relation to the first credit card. Afterwards, when a touch or push input is applied to the power button 122, the first credit card may be selected as payment means.

When a preset time elapses after payment using the first credit card, the display unit 150 may be switched into the OFF state. Or, when a preset time elapses after payment using the first credit card, the smart card 100 may be powered off.

As an exemplary embodiment, when a header portion of the MS emulator illustrated in FIG. 1D is detected by an MS reader, the controller 180 may determine that the smart card 100 has been read by the POS terminal.

Afterwards, when the MS emulator is not detected again by the MS reader for 30 seconds, the controller may determine that the payment has been completed and switch the display unit 150 into the OFF state.

Similarly, as another exemplary embodiment, when the MS emulator is not detected by the MS reader again for 3 minutes after being read by the POS terminal, the controller may control the smart card 100 to be powered off.

In this manner, for checking a lapse of time after payment, the controller 180 may receive counted time information from the RTC module illustrated in FIG. 1D.

That is, as aforementioned, the RTC module can utilize time information during the OTP generation for combining disposable tokens upon the MS payment. Also, the RTC module may check a time for automatic power-off after completion of payment.

Meanwhile, the sensing unit 140 may recognize a fingerprint input to the smart card 100.

The controller 180 may set the smart card 100 from the basically-set default payment means to payment means selected by the user when the fingerprint of the user having the smart card 100 is recognized.

As another exemplary embodiment, the controller 180 may set the input unit 120 to the inactive state when the user's fingerprint is not recognized after the user's fingerprint and the first person's fingerprint are simultaneously recognized.

In detail, the controller 180 may set the input unit 120 to the inactive state when the user's fingerprint and the first person's fingerprint are simultaneously recognized.

Figure 3:
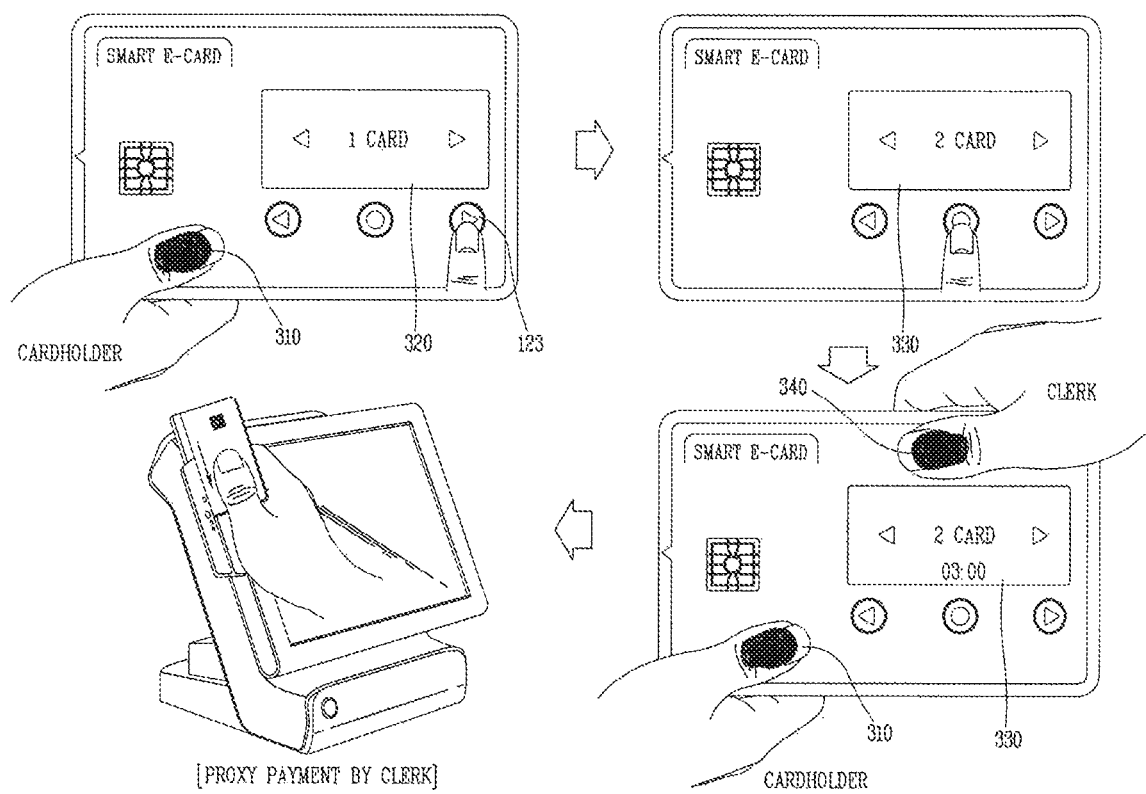
FIG. 3 is a conceptual view illustrating an embodiment of proxy payment by a smart card in accordance with the present invention.

FIG. 3 is a conceptual view illustrating an embodiment of proxy payment by a smart card in accordance with the present invention.

Referring to FIG. 3, a fingerprint 310 of a cardholder (user) may be scanned on the smart card 100 by an operation that the user holds the smart card 100.

In this instance, an input fingerprint may differ according to a manner that the user holds the smart card 100. To this end, a plurality of fingerprints of the user for authentication may be prestored in the smart card 100.

Also, a finger scan sensor may be disposed on an entire or partial area of the smart card 100. As an exemplary embodiment, the finger scan sensor may be disposed only on an area that the user's finger frequently contacts. Or, more finger scan sensors may be disposed on an area that the user's finger frequently contacts, than the other area, or a finger scan sensor with a more precise scanning capability may be disposed on the frequently-contacted area with the user's finger.

As another exemplary embodiment, the finger scan sensor may additionally be provided even on a rear surface of the smart card 100, in addition to the front surface. This may allow that the user's thumb is scanned on the front surface and the user's forefinger is scanned on the rear surface.

When the fingerprint 310 of the user's thumb is scanned (recognized, authenticated), the smart card 100 may be powered on and screen information 320 related to a first credit card, which is a default payment means basically set for payment, may be output on the display unit 150. The screen information 320 of the first credit card may include a name, an available period, or the like, in relation to the first credit card.

Afterwards, a list of payment means may be output by applying a touch or push input to a left or right button 121, 123. As an exemplary embodiment, when the right button 123 is pressed, screen information 330 related to a second credit card may be output. Similarly, the screen information 330 of the second credit card may include a name, an available period, or the like in relation to the second credit card. Afterwards, when a touch or push input is applied to the power (OK) button 122, the second credit card may be selected as payment means.

In turn, the user's fingerprint 310 and a clerk's fingerprint 340 may be simultaneously recognized by an operation that the user hands over the smart card 100 to the clerk. As an exemplary embodiment, a fingerprint 310 of the user's thumb and a fingerprint 340 of the clerk's thumb may simultaneously be recognized.

As another exemplary embodiment, the screen information 330 of the selected second credit card may be output together with a lapsed time of a timer with a preset payment-available time. A detailed embodiment related to this will be explained later.

As another exemplary embodiment, in response to an input of a first person's fingerprint, other than the cardholder, the input unit 120 may be set to an inactive (disable) state. Accordingly, the first person except for the cardholder cannot change the selected payment means.

Afterwards, the clerk may perform the payment using the smart card 100 in a similar manner to the method of performing payment using a typical credit card. That is, the payment using the second credit card may be carried out.

Payment may be carried out in a tapping manner that payment is performed by contacting the smart card 100 with a specific point of a POS terminal. When the smart card 100 is brought into contact with the POS terminal, the smart card 100 may receive a payment request from the POS terminal. In response to the received payment request, the smart card 100 may transmit information related to a second credit card set by the user to the POS terminal using an NFC or Bluetooth module included in the communication unit 110, thereby enabling the payment.

As another example, similar to performing payment by inserting a credit card into a specific terminal, a chip and a magnetic tape 195 of the smart card 100, which are provided on the same positions as those provided on a typical credit card, may be used. The chip and the magnetic tape 195 may allow the second credit card to be recognized by the specific terminal, thereby enabling payment in the same manner as the payment using the typical credit card.

As another example, when identification information related to the second credit card is included in the magnetic tape 195, payment can be performed using the smart card 100, similar to using a typical credit card, even in the POS terminal which reads the magnetic tape 195 of the credit card.

As another example, payment may be performed in a manner of scanning information, such as QR codes or barcodes, of the second credit card. To this end, the information, such as the barcodes or the like, related to the second credit card may be output on the display unit 150.

In this manner, according to the embodiment of FIG. 3, the situation (proxy payment) that the cardholder hands over the smart card 100 to an agent (proxy), such as the clerk or the like, may be detected based on the simultaneous recognition of the cardholder's fingerprint and the agent's fingerprint.

In detail, the proxy payment situation may be detected based on that only the cardholder's fingerprint is first recognized, the cardholder's fingerprint and the agent's fingerprint are simultaneously recognized for a short term of time, and then only the agent's fingerprint is recognized.

Meanwhile, when a preset time elapses after the completion of the payment using the user-selected payment means, the controller 180 may set the display unit 150 to an inactive (OFF) state.

As another example, the controller 180 may reset the input unit 120 to an active (ON) state when the user's fingerprint is recognized again.

As another example, the controller 180 may output payment information by the selected payment means on the display unit 150 when the user's fingerprint is recognized after the completion of the payment using the user-selected payment means.

As another example, the controller 180 may output payment information by the selected payment means on the display unit 150 when only the user's fingerprint is recognized after the user's fingerprint and the first person's fingerprint are simultaneously recognized again within a preset time.

Figure 4:
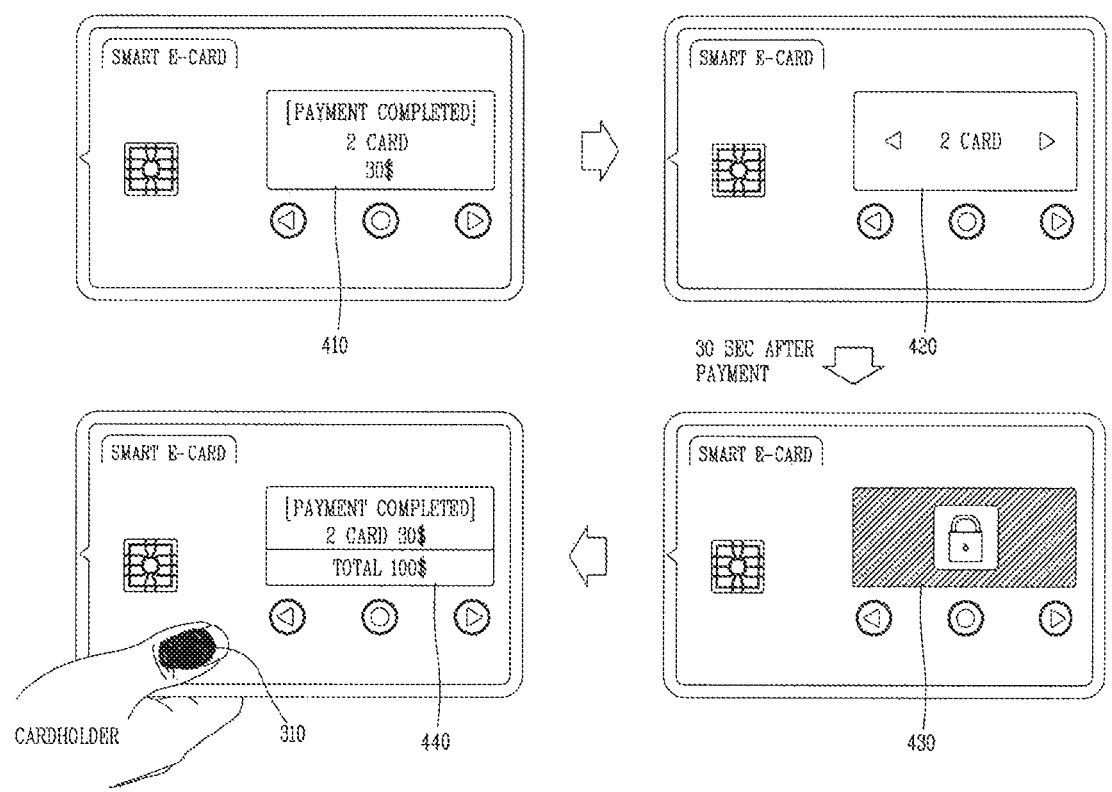
FIG. 4 is a conceptual view illustrating an embodiment after completion of proxy payment by a smart card in accordance with the present invention.

FIG. 4 is a conceptual view illustrating an embodiment after completion of proxy payment by a smart card in accordance with the present invention.

As an embodiment in relation to FIG. 3, referring to FIG. 4, payment information 410 including a name of a payment card, a paid place, a paid amount, and the like may be output on the display unit 150.

After completion of the payment, screen information 420 related to the second credit card which has been selected by the cardholder may be output. For example, a name or available period of the second credit card may briefly be output.

Afterwards, when a time of 30 seconds elapses after the completion of the payment, a card lock mode may be executed and thus the display unit 150 may be switched into the inactive state. In this instance, a lock screen 430 may temporarily be output. The lock screen 430 may be defined as a screen which is temporarily output for notifying the switching of the display unit 150 into the inactive state before the display unit 150 is switched into the inactive state.

Also, along with this, the setting of the smart card 100 may be changed from the second credit card which has been selected by the cardholder to the first credit card set as a default value (default payment means). As an embodiment, a message notifying the change in the card setting may temporarily be output on the lock screen 430. That is, for 30 seconds after the completion of the payment, the setting of the smart card 100 may be fixed to the second credit card.

Afterwards, when only the cardholder's fingerprint is recognized due to the clerk having handed over the smart card 100 to the cardholder, the display unit 150 may be switched into the active (ON) state and payment information 440 may be output on the display unit 150 again.

As an exemplary embodiment, more details 440 than the payment information 440 which is output for the proxy payment may be provided to the cardholder. For example, information related to a monthly payment amount, points, and the like may additionally be output for the cardholder.

As another exemplary embodiment, the input unit 120 may be switched back into the active state in response to the cardholder's fingerprint being authenticated. Accordingly, the cardholder can reselect a card to use for payment.

As another exemplary embodiment, a state for the cardholder to select a payment card may be maintained for a preset time, even though the cardholder does not hold the smart card 100. Accordingly, when an additional input is applied, a payment card may continuously be added.

In this manner, according to the embodiment of FIG. 4, the situation (return) that the agent such as the clerk or the like hands over the smart card 100 back to the cardholder may be detected based on the simultaneously recognition of the cardholder's fingerprint and the agent's fingerprint.

In detail, the return situation may be detected on the basis that only the agent's fingerprint is first recognized, the cardholder's fingerprint and the agent's fingerprint are simultaneously recognized for a short term of time, and then only the cardholder's fingerprint is recognized again.

Meanwhile, the controller 180 may set the smart card 100 from the selected payment means to the default payment means when the user's fingerprint and a first person's fingerprint, other than for the user, are simultaneously recognized and then a preset time elapses after the completion of the payment using the user-selected payment means, and reset the smart card 100 from the default payment means to the selected payment means when the user's fingerprint and the first person's fingerprint are simultaneously recognized again within a preset time.

In detail, the controller 180 may reset the smart card 100 from the default payment means to the selected payment means when the user's fingerprint and the first person's fingerprint are simultaneously recognized within a preset time after only the user's fingerprint is recognized.

Figure 5:
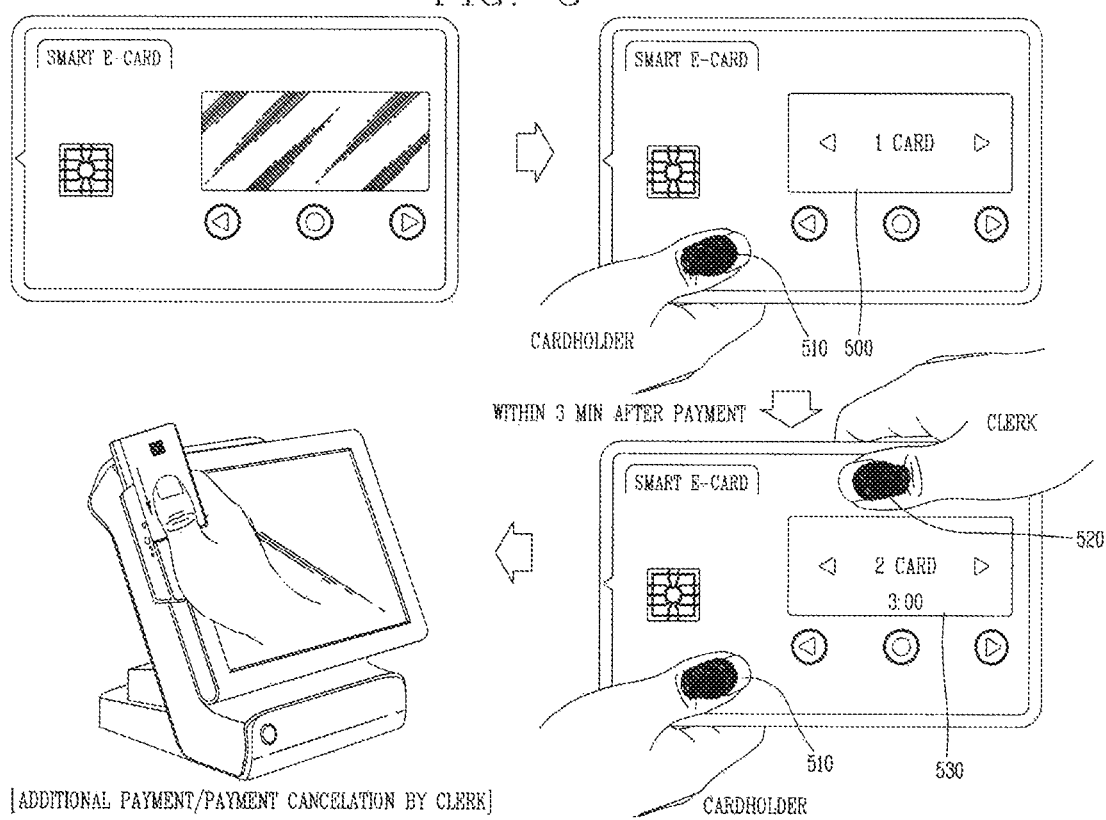
FIG. 5 is a conceptual view illustrating an embodiment of a repayment by a smart card in accordance with the present invention.

FIG. 5 is a conceptual view illustrating an embodiment of a repayment by a smart card in accordance with the present invention.

Referring to FIG. 5, similar to FIG. 4, when a time of 30 seconds elapses after the completion of the payment, the card lock mode may be activated and the display unit 150 may be switched into the inactive state.

Then, when the cardholder's fingerprint is authenticated due to the clerk handing over the card back to the cardholder, as described in relation to FIG. 4, payment information may temporarily be output and then card information 500 related to the first credit card as the default payment means may be output.

Afterwards, when the cardholder who has got the card back from the clerk hands over the card to the clerk again within 3 minutes after the completion of the payment, the cardholder's fingerprint 510 and the clerk's fingerprint 520 may simultaneously be recognized again.

In this manner, the setting of the smart card 100 may be changed from the first credit card (default payment means) into the second credit card which was selected by the cardholder upon the previous payment, when the cardholder's fingerprint 510 and the clerk's fingerprint 520 are simultaneously recognized again.

Accordingly, screen information 530 related to the second credit card may be output on the display unit 150. For example, a name, an available period or the like in relation to the second credit card may be output on the display unit 150.

As another exemplary embodiment, a lapsed time of a timer with a preset payment-available time may be output together with the screen information 530 of the second credit card. A detailed description related to this will be explained later.

As another exemplary embodiment, the input unit 120 may be set to the inactive (disable) state when a first person's fingerprint except for the cardholder is input. Accordingly, the first person (clerk) except for the cardholder cannot change the selected payment means.

Afterwards, the clerk can perform the payment using the smart card 100 in a similar manner to a method of performing payment using a typical credit card. For example, the payment using the second credit card may be performed in a manner of swiping or inserting a card into a POS terminal, scanning barcodes and the like.

That is, the payment which is performed after the cardholder's fingerprint 510 and the clerk's fingerprint 520 are simultaneously recognized again within the predetermined time may be a cancelation of a previous payment or an additional payment to the previous payment. Accordingly, the setting of the smart card 100 may automatically be changed from the default payment means into payment means used for the previous payment. However, this embodiment is merely illustrative, and the present invention will not be limited to the payment cancellation or the additional payment.

In this manner, according to the embodiment of FIG. 5, the situation (repayment) that the cardholder hands over the smart card 100 back to the agent, such as the clerk, may be detected on the basis that the cardholder's fingerprint and the agent's fingerprint are simultaneously recognized.

More concretely, the repayment situation may be detected on the basis that only the cardholder's fingerprint is first recognized, the cardholder's fingerprint and the agent's fingerprint are simultaneously recognized within a short term of time, and then only the agent's fingerprint is recognized again.

Figure 6:
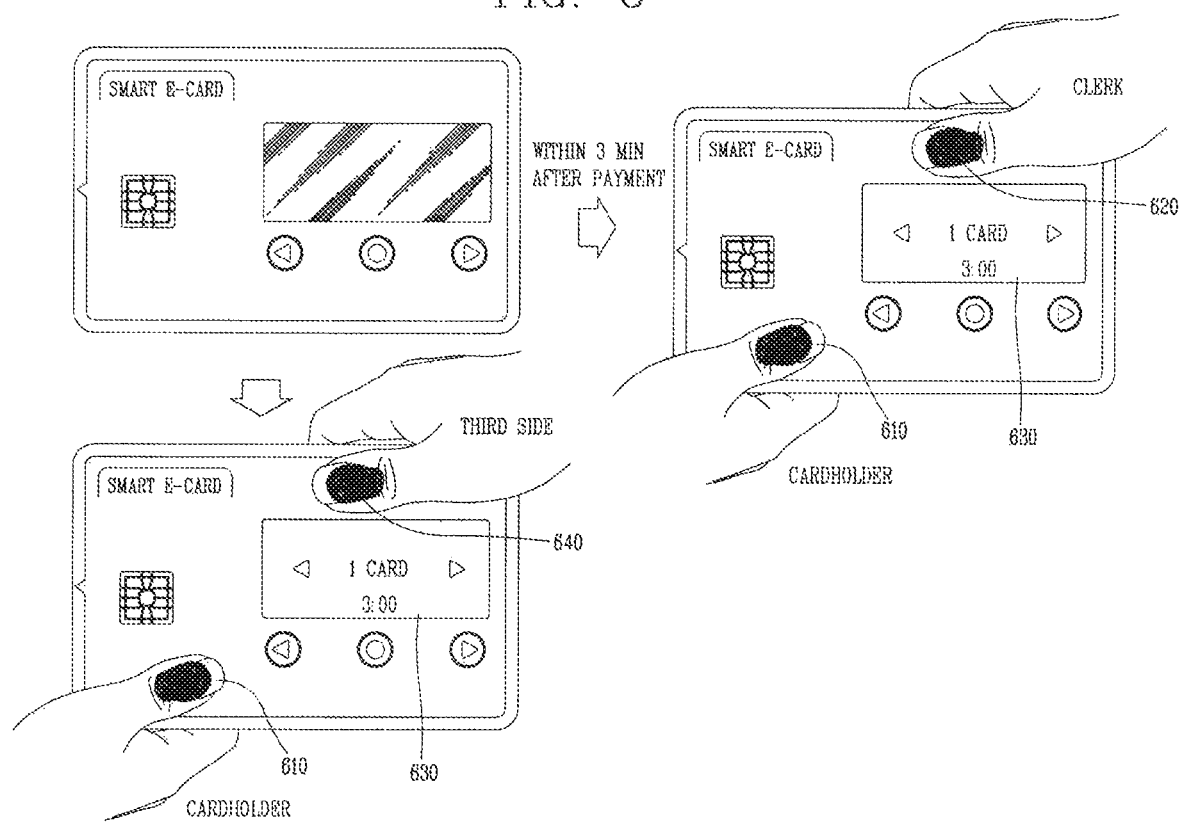
FIG. 6 is a conceptual view illustrating another embodiment after a completion of proxy payment by a smart card in accordance with the present invention.

FIG. 6 is a conceptual view illustrating another embodiment after completion of proxy payment by a smart card in accordance with the present invention.

Referring to FIG. 6, as described in relation to FIG. 4, when a time of 30 seconds elapses after the completion of the payment, the card lock mode may be activated and the display unit 150 may be switched into the inactive (OFF) state.

Afterwards, the cardholder's fingerprint 610 and the clerk's fingerprint 620 may simultaneously be recognized again by an operation that the cardholder with the card back hands over the card to the clerk again, who has performed the payment, when 3 minutes elapses after the completion of the payment.

In this instance, unlike the embodiment of FIG. 5, since the preset time, namely, 3 minutes, have elapsed, the smart card 100 may be continuously set to a first credit card as the default payment means.

Accordingly, screen information 630 related to the first credit card may be output on the display unit 150. For example, a name, an available period or the like of the first credit card may be output on the display unit 150.

As another exemplary embodiment, a lapsed time of the timer with the preset payment-available time may be output together with the screen information 630 of the first credit card. A detailed embodiment related to this will be described later.

As another exemplary embodiment, the input unit 120 may be set to the inactive state in response to an input of a fingerprint of a first person (clerk) except for the cardholder. Accordingly, the first person (clerk) except for the cardholder cannot change the selected payment means.

As another exemplary embodiment, the cardholder's fingerprint 610 and the first person's fingerprint 640 may simultaneously be recognized by an operation that the cardholder with the card back hands over the card to the first person within 3 minutes after the completion of the payment.

In this instance, unlike the embodiment of FIG. 5, when the smart card 100 is handed over to a second person, different from the clerk who has performed the previous payment, even within 3 minutes after the completion of the payment, the smart card 100 may be continuously set to the first credit card which is the default payment means.

In this instance, similar to the aforementioned embodiment, the screen information 630 of the first credit card may be output on the display unit 150. For example, a name, an available period and the like of the first credit card may be output on the display unit 150.

As another exemplary embodiment, a lapsed time of the timer with the preset payment-available time may be output together with the screen information 630 of the first credit card. A detailed embodiment related to this will be explained later.

As another exemplary embodiment, the input unit 120 may be set to the inactive state in response to an input of a first person's fingerprint except for the cardholder. Accordingly, the first person except for the cardholder cannot change the selected payment means.

Meanwhile, the controller 180 may set the timer with the preset payment-available time to the active (ON) state, on the basis that only the continuously-recognized first person's fingerprint is not recognized after the user's fingerprint and the first person's fingerprint are simultaneously recognized.

As another exemplary embodiment, the controller 180 may set the timer with the preset payment-available time to the inactive state when the first person's fingerprint is continuously recognized again.

Here, the timer is for measuring a lapse of the preset payment-available time. The preset payment-available time is shortened when the timer is in the active state. On the other hand, the payment-available time is not shortened when the timer is switched into the inactive state. That is, the payment-available time may be maintained. To this end, the smart card 100 may include a real time clock (RTC) module which checks a lapse of time.

Figure 7:
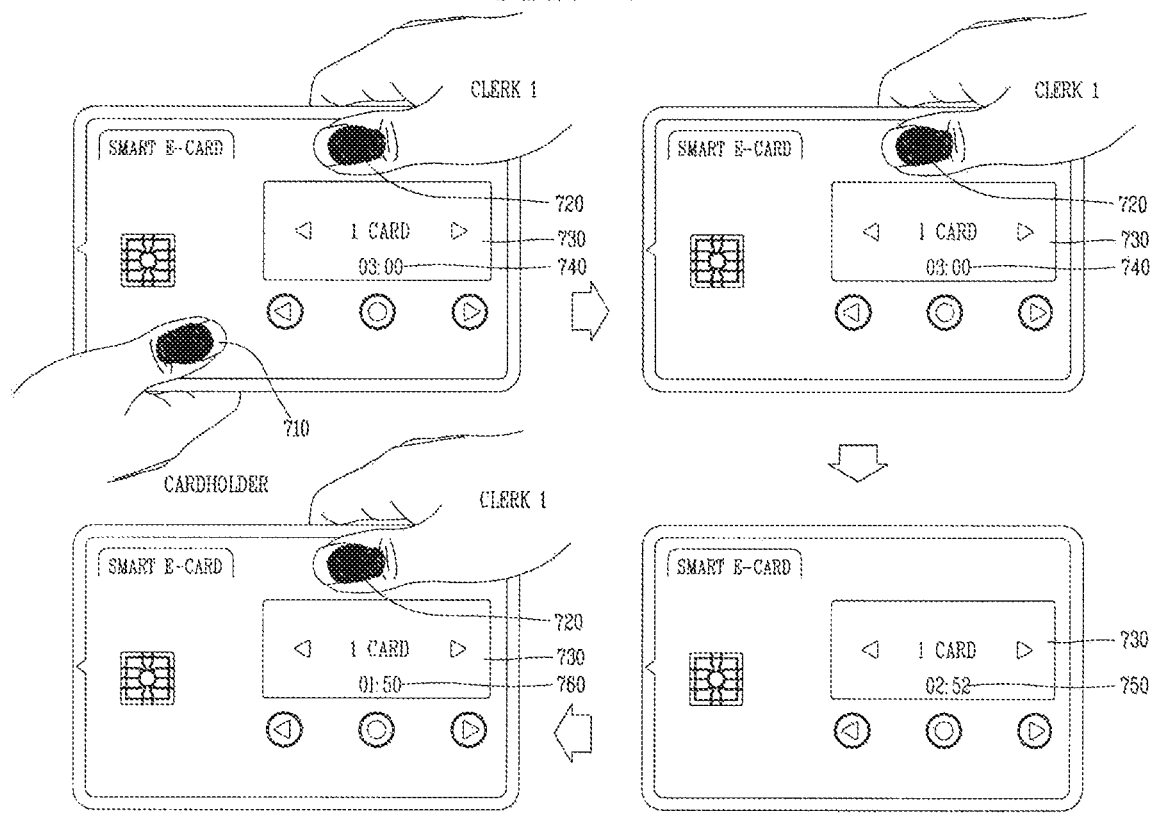
FIG. 7 is a conceptual view illustrating an operation of a timer during a primary proxy payment by a smart card in accordance with the present invention.

FIG. 7 is a conceptual view illustrating an operation of a timer during a primary proxy payment by a smart card in accordance with the present invention.

Referring to FIG. 7, a primary agent (Clerk 1) may first receive the smart card 100 which is handed over from the cardholder. In this instance, a fingerprint 710 of the cardholder and a fingerprint 720 of the primary agent may be simultaneously recognized for a short term of time, and screen information 730 related to a first credit card which is payment means selected by the cardholder may be output on the display unit 150. The screen information 730 of the first credit card may include a name, an available period or the like of the first credit card.

Also, a preset payment-available time 740 set in the timer may be output. As an exemplary embodiment, when the payment-available time is set to 3 minutes, it indicates that the payment should be performed within 3 minutes.

Afterwards, when only the fingerprint 720 of the primary agent who has received the smart card handed over from the cardholder is continuously recognized, the timer is switched into the inactive state and thus the payment-available time of 3 minutes is not shortened.

Then, when the fingerprint 720 of the primary agent is not recognized any more, the timer is switched into the active state and the payment-available time of 3 minutes is reduced. Accordingly, a remaining time 750 according to the lapse of time may be output.

As another exemplary embodiment, when the fingerprint 720 of the primary agent is continuously recognized again, the timer is switched into the inactive state and the remaining time is not reduced. Accordingly, a time 760 which is left after being spent while the timer is activated may be output.

Also, in response to the recognition of the fingerprint of the primary agent, the input unit 120 may be switched into the inactive state. Accordingly, the payment card cannot be changed by anyone except for the cardholder.

According to the embodiment of FIG. 7, the payment-available time is not reduced while the primary agent holds the smart card 100 (while the fingerprint of the primary agent is continuously recognized).

Meanwhile, after the user's fingerprint and the first person's fingerprint are simultaneously recognized, when the first person's fingerprint and a second person's fingerprint, other than the first person, are simultaneously recognized, the controller may set the timer with the preset payment-available time to the active state.

As another exemplary embodiment, after the user's fingerprint and the first person's fingerprint are simultaneously recognized, when the first person's fingerprint and a second person's fingerprint, other than the first person, are simultaneously recognized, the controller 180 may set the input unit 120 to the inactive state.

Figure 8:
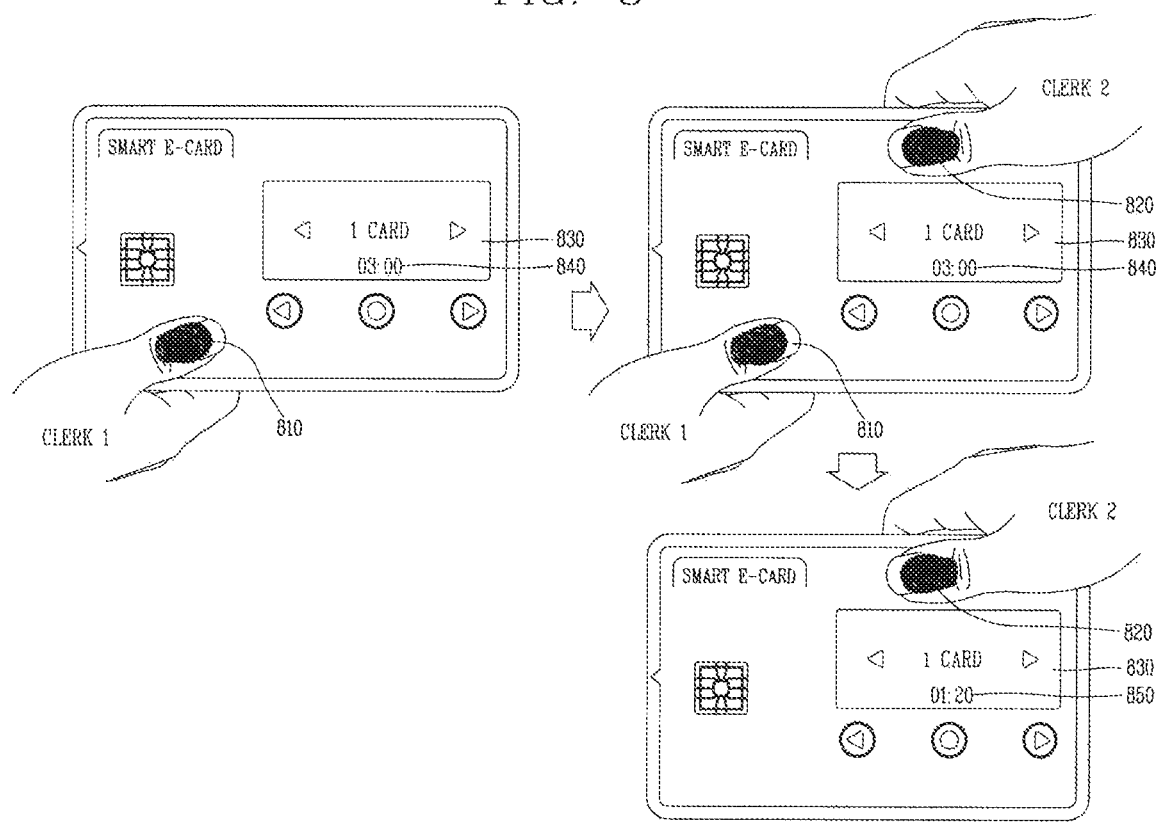
FIG. 8 is a conceptual view illustrating an operation of a timer during a secondary proxy payment by a smart card in accordance with the present invention.

FIG. 8 is a conceptual view illustrating an operation of a timer during a secondary proxy payment by a smart card in accordance with the present invention.

Referring to FIG. 8, as described in FIG. 7, the primary agent (clerk 1) may first receive the smart card 100 which is handed over from the cardholder.

Accordingly, the primary agent's fingerprint 810 may be continuously recognized and screen information 830 related to a first credit card which is payment means selected by the cardholder may be output on the display unit 150. The screen information 830 of the first credit card may include a name, an available period or the like of the first credit card.

Also, a payment-available time 840 preset in the timer may be output. As an exemplary embodiment, when the payment-available time is set to 3 minutes, it indicates that the payment should be performed within 3 minutes.

Afterwards, as the primary agent hands over the smart card 100 to a secondary agent (clerk 2), a fingerprint 810 of the primary agent and a fingerprint 820 of the secondary agent may simultaneously be recognized for a short term of time.

Then, when the primary agent's fingerprint 810 which has received the smart card 100 is not recognized any more and only the secondary agent's fingerprint 820 is continuously recognized, the timer is switched into the active state and thereby the payment-available time of 3 minutes is shortened. Accordingly, a remaining time 850 according to a lapse of time may be output.

Also, as aforementioned, as the fingerprints of the primary agent and the secondary agent are recognized, the input unit 120 may be switched into the inactive state. Accordingly, the payment card cannot be changed by anyone except for the cardholder.

The situation that the primary agent (clerk) hands over the smart card 100 to the secondary agent may be detected on the basis that the fingerprints of the primary agent and the secondary agent are simultaneously recognized.

In detail, the proxy payment situation (secondary proxy payment) may be detected on the basis that only the primary agent's fingerprint is first recognized, the primary agent's fingerprint and the secondary agent's fingerprint are simultaneously recognized for a short term of time, and then only the secondary agent's fingerprint is recognized.

The embodiment illustrated in FIG. 8 may be a case where the clerk who has received the smart card 100 handed over from the cardholder hands over the smart card 100 to a cashier. According to this, when the primary agent (clerk) hands over the smart card 100 to the secondary agent (cashier), the payment-available time is reduced.

As an embodiment in relation to FIG. 8, the secondary agent may perform the payment using the smart card 100 by a method similar to a method of performing payment using a typical credit card. That is, the payment is performed using the first credit card.

For example, payment may be carried out in a tapping manner that payment is performed by contacting the smart card 100 with a specific point of a POS terminal. When the smart card 100 is brought into contact with the POS terminal, the smart card 100 may receive a payment request from the POS terminal. In response to the received payment request, the smart card 100 may transmit information related to the second credit card set by the user to the POS terminal using an NFC or Bluetooth module included in the communication unit 110, thereby enabling payment.

As another example, similar to performing payment by inserting a credit card into a specific terminal, a chip and a magnetic tape 195 of the smart card 100, which are provided on the same positions as those provided on a typical credit card, may be used. The chip and the magnetic tape 195 may allow the second credit card to be recognized by the specific terminal, thereby enabling payment in the same manner as that using the typical credit card.

As another example, when identification information related to the second credit card is included in the magnetic tape 195, payment can be performed using the smart card 100, similar to using a typical credit card, even in the POS terminal which reads the magnetic tape 195 of the credit card.

As another example, payment may be performed in a manner of scanning information, such as QR codes or barcodes, in relation to the second credit card. To this end, the information, such as the barcodes or the like, related to the second credit card may be output on the display unit 150.

Upon completion of the payment, similar to that illustrated in FIG. 4, payment information, such as a name of the payment card, a paid place, a paid amount and the like, may be output on the display unit 150.

And, after the completion of the payment, screen information related to the first credit card which has been selected by the cardholder may be output. For example, the name or available period of the first credit card may briefly be output. Afterwards, when a time of 30 seconds elapses after the completion of the payment, a card lock mode may be activated and thus the display unit 150 may be switched into the inactive state. In this instance, a lock screen may temporarily be output. The lock screen may be defined as a screen which is temporarily output for notifying the switching of the display unit 150 into the inactive state before the display unit 150 is switched into the inactive state.

Also, along with this, the setting of the smart card 100 may be changed from the first credit card which has been selected by the cardholder to the default credit card set as the default value (default payment means). As an embodiment, a message notifying the change in the card setting may temporarily be output on the lock screen. That is, for 30 seconds after the completion of the payment, the setting of the smart card 100 may be fixed to the first credit card.

Afterwards, the lock state of the smart card 100 may continuously be maintained even when the secondary agent hands over the smart card 100 to the primary agent. Then, when the primary agent hands over the smart card 100 to the cardholder, the lock state of the smart card 100 may finally be released.

That is, the lock state of the smart card 100 may continuously be maintained even when the secondary agent's fingerprint and the primary agent's fingerprint are simultaneously recognized for a short term of time and then only the primary agent's fingerprint is recognized, which is caused by the operation that the secondary agent hands over the smart card 100 to the primary agent.

Then, the lock state of the smart card may be released when the primary agent's fingerprint and the cardholder's fingerprint are simultaneously recognized for a short term of time and then only the cardholder's fingerprint is recognized, which is caused by the operation that the primary agent hands over the smart card 100 to the cardholder.

As an exemplary embodiment, in response to the release of the locked smart card 100, the display unit 150 may be switched into the active state and thus payment information may be output on the display unit 150.

As another exemplary embodiment, more details than the payment information which is output upon the proxy payment may be provided to the cardholder. For example, information related to a monthly payment amount, points, and the like may additionally be output for the cardholder.

As another exemplary embodiment, the input unit 120 may be switched into the active state, in response to the cardholder's fingerprint being recognized.

Accordingly, the cardholder can reselect a card to use for payment.

A smart card and a method for controlling the same according to the present invention will provide the following effects.

According to at least one of embodiments of the present invention, a previously-set payment means can automatically be reset merely by an operation of handing over the smart card to a clock again after completion of payment.

Also, according to at least one of embodiments of the present invention, an input button can be set to an inactive state when a first person's fingerprint except for the smart cardholder is scanned through a finger scan technology. Accordingly, the first person except for the cardholder cannot change the selected payment means.

A payment-available time can be set to prevent risks such as personal information exposure, a theft and the like, which may be likely to happen due to a delay of payment. In detail, the payment-available time may be reduced only under a situation except for a specific condition authenticated by the cardholder (e.g., a case where a first person whose fingerprint is recognized simultaneously with the cardholder's fingerprint has the card belonging to the cardholder), thereby enabling payment more safely and efficiently.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A smart card comprising:
   a sensor configured to sense a finger touch; and
   a controller configured to:
   cause a first setting change by setting the smart card from a default payment method to a selected payment method selected by a user, when a fingerprint of the user is recognized based on the finger touch sensed by the sensor;
   cause a second setting change by setting the smart card from the selected payment method to the default payment method when the fingerprint of the user and a fingerprint of a first person other than the user are simultaneously recognized and a first preset time elapses after completion of payment using the selected payment method; and
   cause a third setting change by setting the smart card from the default payment method to the selected payment method when the fingerprint of the user and the fingerprint of the first person are simultaneously recognized again within a second preset time.

2. The smart card of claim 1, further comprising a display, wherein the controller is further configured to set the display to an inactive state after completion of the payment.

3. The smart card of claim 1, further comprising an input unit, wherein the controller is further configured to set the input unit to an inactive state when the fingerprint of the user is not recognized after the first setting change.

4. The smart card of claim 3, wherein the controller is further configured to reactivate the input unit when the fingerprint of the user is recognized again.

5. The smart card of claim 1, further comprising an input unit, wherein the controller is further configured to set the input unit to an inactive state after the first setting change.

6. The smart card of claim 1, further comprising an input unit, wherein the controller is further configured to set the input unit to an inactive state when the fingerprint of the first person and a fingerprint of a second person other than the first person are simultaneously recognized after the first setting change.

7. The smart card of claim 1, wherein:
   the first setting change is caused when the fingerprint of the user is recognized in addition to simultaneously recognizing the fingerprint of the first person; and
   the controller is further configured to set a timer corresponding to a payment-available time period when the fingerprint of the first person is not continuously recognized after the first setting change.

8. The smart card of claim 7, wherein the controller is further configured to deactivate the timer when the fingerprint of the first person is continuously recognized.

9. The smart card of claim 1, wherein:
   the first setting change is caused when the fingerprint of the user is recognized in addition to simultaneously recognizing the fingerprint of the first person; and
   the controller is further configured to set a timer corresponding to a payment-available time period when the fingerprint of the first person and a fingerprint of a second person other than the first person are simultaneously recognized after the first setting change.

10. The smart card of claim 1, further comprising a display, wherein the controller is further configured to cause the display to display payment information completed using the selected payment method when the fingerprint of the user is recognized after completion of the payment.

11. The smart card of claim 1, further comprising a display, wherein the controller is further configured to cause the display to display completed payment information using the selected payment method when only the fingerprint of the user is recognized after the third setting change.

12. The smart card of claim 11, wherein the controller is further configured to cause the third setting change when the fingerprint of the user and the fingerprint of the first person are simultaneously recognized again within the second preset time after only the fingerprint of the user is recognized following completion of the payment.

13. A method for controlling a smart card, the method being performed by a processor and comprising:
- sensing, with a sensor, a finger touch to the smart card, wherein the sensor is configured to sense the finger touch to the smart card;
- causing, by the processor, a first setting change by setting the smart card from a default method to a selected method selected by a user when a fingerprint of the user is recognized based on the finger touch;
- causing, by the processor, a second setting change by setting the smart card from the selected method to the default method when the fingerprint of the user and a fingerprint of a first person other than the user are simultaneously recognized by the sensor and a first preset time elapses after completion of transaction using the selected method; and
- causing, by the processor, a third setting change by resetting the smart card from the default method to the selected method when the fingerprint of the user and the fingerprint of the first person are simultaneously recognized again within a second preset time.

14. The method of claim 13, further comprising setting a display of the smart card to an inactive state after completion of the transaction.

15. The method of claim 13, further comprising:
- setting an input unit of the smart card to an inactive state when the fingerprint of the user is not recognized after the first setting change; and
- reactivating the input unit when the fingerprint of the user is recognized again.

16. The method of claim 13, further comprising setting an input unit of the smart card to an inactive state after the first setting change.

17. The method of claim 13, further comprising setting an input unit of the smart card to an inactive state when the fingerprint of the first person and a fingerprint of a second person other than the first person are simultaneously recognized after the first setting change.

18. The method of claim 13, wherein:
- the first setting change is caused when the fingerprint of the user is recognized in addition to simultaneously recognizing the fingerprint of the first person; and
- the method further comprises setting a timer corresponding to a transaction-available time period when the fingerprint of the first person is not continuously recognized after the first setting change, and deactivating the timer when the fingerprint of the first person is continuously recognized.

19. The method of claim 13, wherein:
- the first setting change is caused when the fingerprint of the user is recognized in addition to simultaneously recognizing the fingerprint of the first person; and
- the method further comprises setting a timer corresponding to a transaction-available time period when the fingerprint of the first person and a fingerprint of a second person other than the first person are simultaneously recognized after the first setting change.

20. The method of claim 13, further comprising:
- causing completed transaction information to be displayed on a display using the selected method on a display of the smart card when only the fingerprint of the user is recognized after the third setting change; and
- causing, by the processor, the third setting change when the fingerprint of the user and the fingerprint of the first person are simultaneously recognized again within the second preset time after only the fingerprint of the user is recognized following completion of the transaction.

* * * * *